US012579096B2

(12) United States Patent
Wang et al.

(10) Patent No.: US 12,579,096 B2
(45) Date of Patent: Mar. 17, 2026

(54) APPARATUS AND CONTROLLING METHOD FOR TWO-WIRE SERIAL BUS

(71) Applicant: RAYMX Microelectronics Corp., Anhui Province (CN)

(72) Inventors: Wei Wang, Anhui Province (CN); Cheng-Yu Chen, Taipei City (TW)

(73) Assignee: RAYMX MICROELECTRONICS CORP., Anhui Province (CN)

( * ) Notice: Subject to any disclaimer, the term of this patent is extended or adjusted under 35 U.S.C. 154(b) by 2 days.

(21) Appl. No.: 18/739,448

(22) Filed: Jun. 11, 2024

(65) Prior Publication Data

US 2025/0284655 A1 Sep. 11, 2025

(30) Foreign Application Priority Data

Mar. 7, 2024 (CN) .......................... 202410264138.6

(51) Int. Cl.
*G06F 13/14* (2006.01)
*G06F 13/42* (2006.01)

(52) U.S. Cl.
CPC .. *G06F 13/4282* (2013.01); *G06F 2213/0016* (2013.01)

(58) Field of Classification Search
None
See application file for complete search history.

(56) References Cited

U.S. PATENT DOCUMENTS

| | | | |
|---|---|---|---|
| 10,860,513 B1 * | 12/2020 | Cheung | G06F 13/4282 |
| 2011/0302351 A1 * | 12/2011 | Aybay | H04L 12/403 |
| | | | 711/E12.002 |
| 2018/0246559 A1 | 8/2018 | Namgoong | |
| 2022/0252460 A1 * | 8/2022 | Yeh | G11C 7/04 |
| 2023/0386268 A1 * | 11/2023 | Scarbrough | H04N 7/183 |

* cited by examiner

*Primary Examiner* — Henry Tsai
*Assistant Examiner* — Dean Phan
(74) *Attorney, Agent, or Firm* — McClure, Qualey & Rodack, LLP

(57) ABSTRACT

An apparatus and a controlling method for a two-wire serial bus are provided. The apparatus is coupled to a host and a plurality of sensors via the two-wire serial bus, and includes a storage member and a control circuit. The storage member is configured to store an event table that includes triggering conditions respectively corresponding to the sensors. The control circuit is coupled to the storage member and configured to periodically query a detection value of each of the sensors in sequence to determine that the detection value of the sensor meets one of the triggering conditions corresponding to the sensor, and to produce a notification signal to the host through the two-wire serial bus according to the determined result; the notification signal indicates the sensor that meets the triggering condition. The host executes a processing program corresponding to the sensor in response to the notification signal.

14 Claims, 4 Drawing Sheets

| b7 | b6 | b5 | b4 | b3 | b2 | b1 | b0 | |
|----|----|----|----|----|----|----|----|----|
| Vid | | | | | Num_DP | | | B0 |
| | Addre_T | | | | | | | B1 |
| Code_ST | | | | | | | | B2 |
| TC_i | | | | | | | | B3 |
| TH_i | | | | | | | | B4 |
| | | | | | | | | B5 |
| | | | | | | | | B6 |
| | | | | | | | | B7 |

FIG. 2

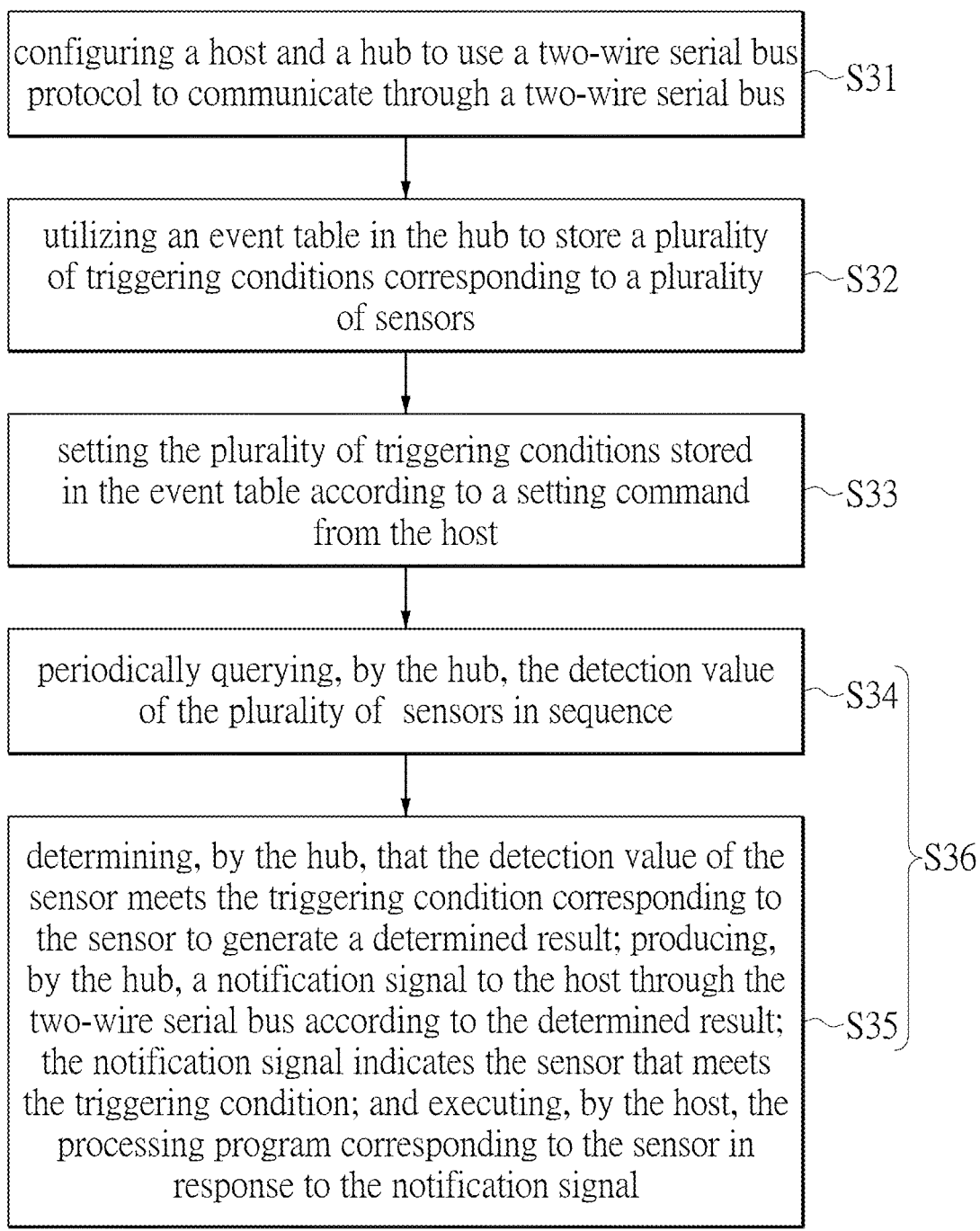

configuring a host and a hub to use a two-wire serial bus protocol to communicate through a two-wire serial bus ~S31 utilizing an event table in the hub to store a plurality of triggering conditions corresponding to a plurality of sensors ~S32 setting the plurality of triggering conditions stored in the event table according to a setting command from the host ~S33 periodically querying, by the hub, the detection value of the plurality of sensors in sequence ~S34 determining, by the hub, that the detection value of the sensor meets the triggering condition corresponding to the sensor to generate a determined result; producing, by the hub, a notification signal to the host through the two-wire serial bus according to the determined result; the notification signal indicates the sensor that meets the triggering condition; and executing, by the host, the processing program corresponding to the sensor in response to the notification signal ~S35

APPARATUS AND CONTROLLING METHOD FOR TWO-WIRE SERIAL BUS

CROSS-REFERENCE TO RELATED PATENT APPLICATION

This application claims the benefit of priority to China Patent Application No. 202410264138.6, filed on Mar. 7, 2024, in the People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an apparatus and a controlling method, and more particularly to an apparatus and a controlling method for a two-wire serial bus that are capable of reducing the system load of multiple sensors polled by a host on a two-wire serial bus.

BACKGROUND OF THE DISCLOSURE

Generally, a host may be coupled with multiple sensors through a two-wire serial bus and periodically query a detection value of each sensor in sequence (i.e., poll the sensors). If the detection value of one of the queried sensors meets a triggering condition, the host executes the processing program corresponding to that sensor.

Various common two-wire serial bus protocols are available, such as an improved inter-integrated circuit (I3C) bus protocol, an inter-integrated circuit (I2C) bus protocol, and a system management bus (SMBus) protocol. Specifically, the I2C bus can operate at speeds of from 10 KHz to 5 MHz, while the SMBus can operate at speeds of from 10 KHz to 100 KHz. Therefore, the I2C bus and SMBus can be used interchangeably at speeds of from 10 KHz to 100 KHz, while the I3C bus can operate at a base clock rate of up to 12.5 MHz and is backward compatible with the I2C bus. In addition, the communication mode of the I2C bus and SMBus is half-duplex, and the communication mode of the I3C bus is full-duplex.

However, polling multiple sensors by a host on a two-wire serial bus is bound to consume system resources of the host. In addition, when a two-wire serial bus protocol supported by the sensors is lower than a two-wire serial bus protocol supported by the host, the host must downscale in order to be able to communicate with the sensors, causing a degradation of the performance of the host. Therefore, how to overcome the above problems to reduce the system load on multiple sensors queried by the host on a two-wire serial bus has become one of the important issues in the relevant field.

SUMMARY OF THE DISCLOSURE

In response to the above-referenced technical inadequacies, the present disclosure provides an apparatus and a controlling method for a two-wire serial bus that are capable of reducing the system load of multiple sensors polled by a host on a two-wire serial bus.

In order to solve the above-mentioned problems, one of the technical aspects adopted by the present disclosure is to provide an apparatus coupled between a host and a plurality of sensors via a two-wire serial bus, and includes a storage member configured to store an event table, and a control circuit. The control circuit is coupled to the storage member. The event table includes a plurality of triggering conditions respectively corresponding to the plurality of sensors. The control circuit is configured to periodically query a detection value of each of the plurality of sensors in sequence, to determine that the detection value of the sensor meets one of the triggering conditions corresponding to the sensor, and to produce a notification signal to the host through the two-wire serial bus according to the determined result; in which the notification signal indicates the sensor that meets the triggering condition. The host executes a processing program corresponding to the sensor in response to the notification signal.

In order to solve the above-mentioned problems, another one of the technical aspects adopted by the present disclosure is to provide a controlling method for a two-wire serial bus. A hub is coupled between a host and a plurality of sensors, and the controlling method includes: utilizing an event table in the hub to store a plurality of triggering conditions corresponding to the plurality of sensors; periodically querying, by the hub, a detection value of the plurality of sensors in sequence; determining, by the hub, that the detection value of the sensor meets one of the triggering conditions corresponding to the sensor to generate a determined result; producing, by the hub, a notification signal to the host through the two-wire serial bus according to the determined result; wherein the notification signal indicates the sensor that meets the triggering condition; and executing, by the host, a processing program corresponding to the sensor in response to the notification signal.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 2 is a schematic diagram of one of table entries of an event table for storing a triggering condition and a threshold corresponding to one of multiple sensors according to one embodiment of the present disclosure;

FIG. 3 is a flowchart of a controlling method for a two-wire serial bus according to one embodiment of the present disclosure.

Figure 1:
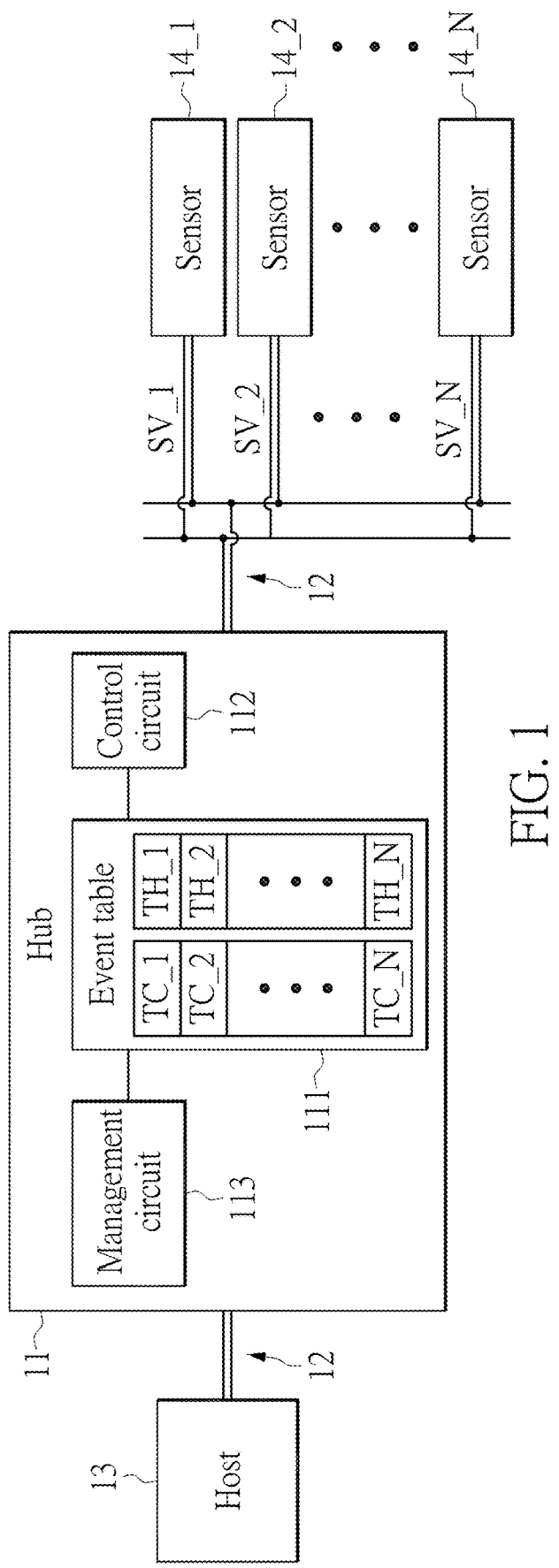
FIG. 1 is a functional block diagram of a hub for a two-wire serial bus according to one embodiment of the present disclosure.

DETAILED DESCRIPTION OF THE
EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Referring to FIG. 1, FIG. 1 is a functional block diagram of an apparatus (e.g., a hub) for a two-wire serial bus according to one embodiment of the present disclosure. As shown in FIG. 1, a hub 11 (the apparatus of the present disclosure) of this embodiment is coupled between a host 13 and a plurality of sensors 14_1 to 14_N (in which N is an integer greater than 1) via a two-wire serial bus 12, and the hub 11 includes a storage member configured to store an event table 111, and a control circuit 112. The event table 111 and the control circuit 112 may be implemented by hardware (e.g., a microprocessor and a memory) coupled with software and/or firmware. However, a specific implementation of the event table 111 and the control circuit 112 are not limited in the present disclosure.

The control circuit 112 is coupled to the event table 111 (i.e., coupled to the storage member), and the event table 111 is configured to store a plurality of triggering conditions TC_1 to TC_N corresponding to the plurality of sensors 14_1 to 14_N. In addition, the control circuit 112 is configured to periodically query the detection value of each of the sensors in sequence, to determine that the detection value SV_i of the sensor 14_i meets one of the triggering conditions TC_i (in which i is an integer within a range of from 1 to N) corresponding to the sensors 14_i, and to produce a notification signal to the host through the two-wire serial bus according to the determined result; the notification signal indicates one of the sensor 14_i that meets the triggering condition TC_i, and, the host 13 to executes a processing program corresponding to the sensor 14_i in response to the notification signal.

Therefore, compared to the existing technology, the sensors 14_1 to 14_N are polled through the hub 11 in the present disclosure, thereby reducing the system load for the host 13 polling the sensors 14_1 to 14_N. Specifically, the event table 111 may further be configured to store a plurality of thresholds TH_1 to TH_N corresponding to the sensors 14_1 to 14_N, and the triggering condition TC_i is one or a combination of an occurrence of a first change event and an occurrence of a second change event with respect to the detection value SV_i. The occurrence of the first change event with respect to the detection value SV_i is the detection value being changed to be from greater than the threshold TH_i to less than or equal to the threshold TH_i, and the occurrence of the second change event with respect to the detection value SV_i is the detection value being changed to be from less than the threshold TH_i to greater than or equal to the threshold TH_i.

In other words, setting the triggering condition TC_i to be the occurrence of the first change event with respect to the detection value SV_i indicates setting a negative edge trigger, and setting the triggering condition TC_i to be the occurrence of the second change event with respect to the detection value SV_i indicates setting a positive edge trigger. Accordingly, the control circuit 112 may be further configured to record the detection value SV_i of the previously queried sensor 14_i. In addition, the event table 111 of the present embodiment may include a plurality of table entries for storing the triggering conditions TC_1 to TC_N and the thresholds TH_1 to TH_N corresponding to the sensors 14_1 to 14_N, respectively. Referring to FIG. 2, FIG. 2 is a schematic diagram of one of table entries of an event table for storing a triggering condition and a threshold corresponding to one of multiple sensors according to one embodiment of the present disclosure.

As shown in FIG. 2, each table entry of the event table 111 may include 8 bytes of B0 to B7, and each of the bytes contains 8 bits of b0 to b7. Specifically, the bits b0 to b2 of the byte B0 may be used to store the downstream port number Num_DP of the hub 11, and the bits b0 to b6 of the byte B1 may be used to store a target address Addre_T of the sensor corresponding to the aforementioned downstream port number Num_DP. In addition, the bits b0 to b7 of the byte B2 can be used to store the code Code_ST indicating types of sensors.

In this embodiment, the types of sensors may include a general-purpose sensor, a temperature sensor, a voltage sensor, and a current sensor that are represented by the code Code_ST of 0x00, 0x01, 0x02, and 0x03, respectively. Therefore, by reading the bytes B0 to B2, the control circuit 112 is able to acknowledge which sensor (e.g., the sensor 14_i) the current table entry corresponds to and acknowledge which sensor type the sensor 14_i is.

Next, the bits b0 to b7 of byte B3 can be used to store the triggering condition TC_i corresponding to the sensor 14_i. For example, when the triggering condition TC_i currently stored in the table entry is set to 0x01, the triggering condition TC_i is an occurrence of the first change event with respect to the detection value SV_i, and when the triggering condition TC_i currently stored in the table entry is set to 0x02, the triggering condition TC_i is an occurrence of the second change event with respect to the detection value SV_i. In addition, when the triggering condition TC_i currently stored in the table entry is set to 0x03, the triggering condition TC_i is a combination of the occurrence of the first change event and the occurrence of the second change event with respect to the detection value SV_i.

Then, the bytes B4 to B7 can be used to store the threshold TH_i corresponding to the sensor 14_i. For example, the threshold TH_i stored in the current table entry can be set to 0x200. Therefore, in the case where the triggering condition TC_i stored in the current table entry is set to 0x01, when the detection value SV_i previously queried by the control circuit 112 is greater than 0x200 and the detection value SV_i currently queried is less than or equal to 0x200 (i.e., the first change event with respect to the detection value SV_i that is changed to be from greater than the threshold TH_i to less than or equal to the threshold TH_i has occurred), the control circuit 112 can determine that the detection value SV_i of the sensor 14_i meets the triggering condition TC_i and can notify the host through the two-wire serial bus 12 to execute a processing program corresponding to the sensor 14_i.

In contrast, in the case where the triggering condition TC_i stored in the current table entry is set to 0x02, when the detection value SV_i previously queried by the control circuit 112 is less than 0x200 and the detection value SV_i currently queried is greater than or equal to 0x200 (i.e., the second change event with regard to the detection value SV_i that is changed to be from less than the threshold TH_i to greater than or equal to the threshold TH_i has occurred), the control circuit 112 can determine that the detection value SV_i of the sensor 14_i meets the triggering condition TC_i, and can notify the host 13 through the two-wire serial bus 12 to execute the processing program corresponding to the sensor 14_i. It should be noted that, the present disclosure does not limit specific contents of the processing program corresponding to the sensor 14_i.

On the other hand, in certain embodiments, the triggering condition TC_i and the threshold TH_i corresponding to the sensor 14_i may further have more than one configuration. That is, multiple table entries in the event table 111 may correspond to the sensor 14_i, but the triggering conditions and thresholds stored in these table entries are different from each other. Essentially, depending on practical requirements and applications, only one of the multiple table entries corresponding to the sensor 14_i will be set to be valid, such that the control circuit 112 only needs to read the triggering condition TC_i and the threshold TH_i stored in the table entry that is set to be valid. Therefore, the bit b7 of the byte B0 can be used to store a characteristic value Vid indicating whether or not the current table entry is valid. In another embodiment, the priority field in the event table 111 is used to store the priority value corresponding to the sensor 14_i. In this way, for the sensor 14_i with a higher priority, the polling interval is set to be relatively short (e.g., each polling interval), while the polling interval of the sensor 14_j with a lower priority will be longer (e.g., three polling interval). However, the present disclosure is not limited by the above-mentioned examples. In certain embodiments, the event table includes a plurality of priority fields, and the values in the priority fields respectively correspond to the polling interval of the plurality of sensors, but the present disclosure is not limited thereto.

As shown in FIG. 1, accordingly, the hub 11 may further include a management circuit 113, and the management circuit 113 is coupled between the host 13 and the event table 111 (i.e., coupled to the storage member). The management circuit 113 is configured to receive a setting command from the host 13 via the two-wire serial bus 12 and set the triggering conditions TC_1 to TC_N of the event table 111 according to the setting command.

In this embodiment, the two-wire serial bus 12 is an improved inter-integrated circuit (I3C) bus. In addition, the host 13 and the hub 11 may communicate by using an I3C bus protocol, and the host 13 configures the event table 111 through the two-wire serial bus 12 and the management circuit 113. However, the present disclosure does not limit a specific manner in which the host 13 configures the event table 111 through the two-wire serial bus 12 and the management circuit 113.

Furthermore, the hub 11 and the host 13 may be an I3C hub and an I3C host, and each of the sensors may be a target device that adopts any of the two-wire serial bus protocols (e.g., an I3C bus protocol, an I2C bus protocol, or a system management bus (SMBus) protocol). That is, each of the sensors is an I3C target device, an I2C target device, or an SMBus target device, and communicates with the hub 11 by using the I3C bus protocol, the I2C bus protocol, or the SMBus protocol.

It should be noted that, without the cooperative operation of the hub 11, when the sensor 14_i is an I2C target device, the sensor 14_i requires additional pins for initiating an interrupt request to the host 13. Therefore, comparing to the above-mentioned cases, the present disclosure polls the sensors 14_1 to 14_N through the hub 11 (i.e., the I3C hub) that communicates with the host 13 by using the I3C bus protocol; furthermore, based on the in-band interrupt (IBI) technology introduced in the I3C bus protocol, the control circuit 112 is enabled to initiate an in-band interrupt request to the host 13 through the two-wire serial bus 12, so as to notify the host 13 to execute a processing program corresponding to the sensor 14_i, thereby reducing the requirements of pins for initiating an interrupt request to the host 13.

In certain embodiments, each of the sensors may be one of an I2C target device and an SMBus target device and may communicate with the hub 11 by using an I2C bus protocol, but the present disclosure is not limited thereto. In summary, in the case where the sensors 14_1 to 14_N are polled by the hub 11, the host 13 does not need to be downgraded to communicate with the sensors that are I2C target devices. Similarly, in the case where the sensors 14_1 to 14_N are polled by the hub 11, the host 13 does not need to be downgraded to communicate with the sensors that are the SMBus target devices. In addition, in certain embodiments, each of the sensors may be one of an I2C target device and an SMBus target device, and the host 13 may also be directly connected to at least one I3C target device (not shown in FIG. 1).

On the other hand, referring to FIG. 3 and FIG. 1, FIG. 3 is a flowchart of a controlling method for a two-wire serial bus according to one embodiment of the present disclosure. As shown in FIG. 3, accordingly, the controlling method of the present embodiment may include the following processes.

Step S31 includes: configuring a host and a hub to use a two-wire serial bus protocol to communicate through a two-wire serial bus. Specifically, as described above, the host 13 and the hub 11 may be configured to communicate by using the I3C bus protocol.

Step S32 includes: utilizing an event table in the hub to store a plurality of triggering conditions corresponding to a plurality of sensors.

Step S33 includes: setting the plurality of triggering conditions stored in the event table according to a setting command from the host.

Step S34 includes: periodically querying, by the hub, the detection value of the plurality of sensors in sequence.

Step S35 includes: determining, by the hub, that the detection value of the sensor meets the triggering condition corresponding to the sensor to generate a determined result; producing, by the hub, a notification signal to the host through the two-wire serial bus according to the determined result; the notification signal indicates the sensor that meets the triggering condition; and executing, by the host, the processing program corresponding to the sensor in response to the notification signal. For the convenience of the following descriptions, steps S34 and S35 may be combined into step S36, and because the relevant details have been described in the foregoing descriptions, they will not be repeated herein. In certain embodiments, the notification signal is transmitted via an in-band interrupt request of the improved inter-integrated circuit (I3C) bus protocol.

It should be noted that, in the case where the hub 11 and the host 13 communicate by using the I3C bus protocol, the control circuit 112 may initiate an in-band interrupt request to the host 13 through the two-wire serial bus 12 to notify the host 13 to execute a processing program corresponding to the sensor 14_i. In addition, the implementation of the control circuit 112 periodically querying the detection value of each of the sensors in sequence and initiating an in-band interrupt request (i.e., step S36 in the above-mentioned case) to the host 13 through the two-wire serial bus 12 in the above-mentioned cases is described through specific embodiments, but the present disclosure in not limited thereto.

Figure 4:
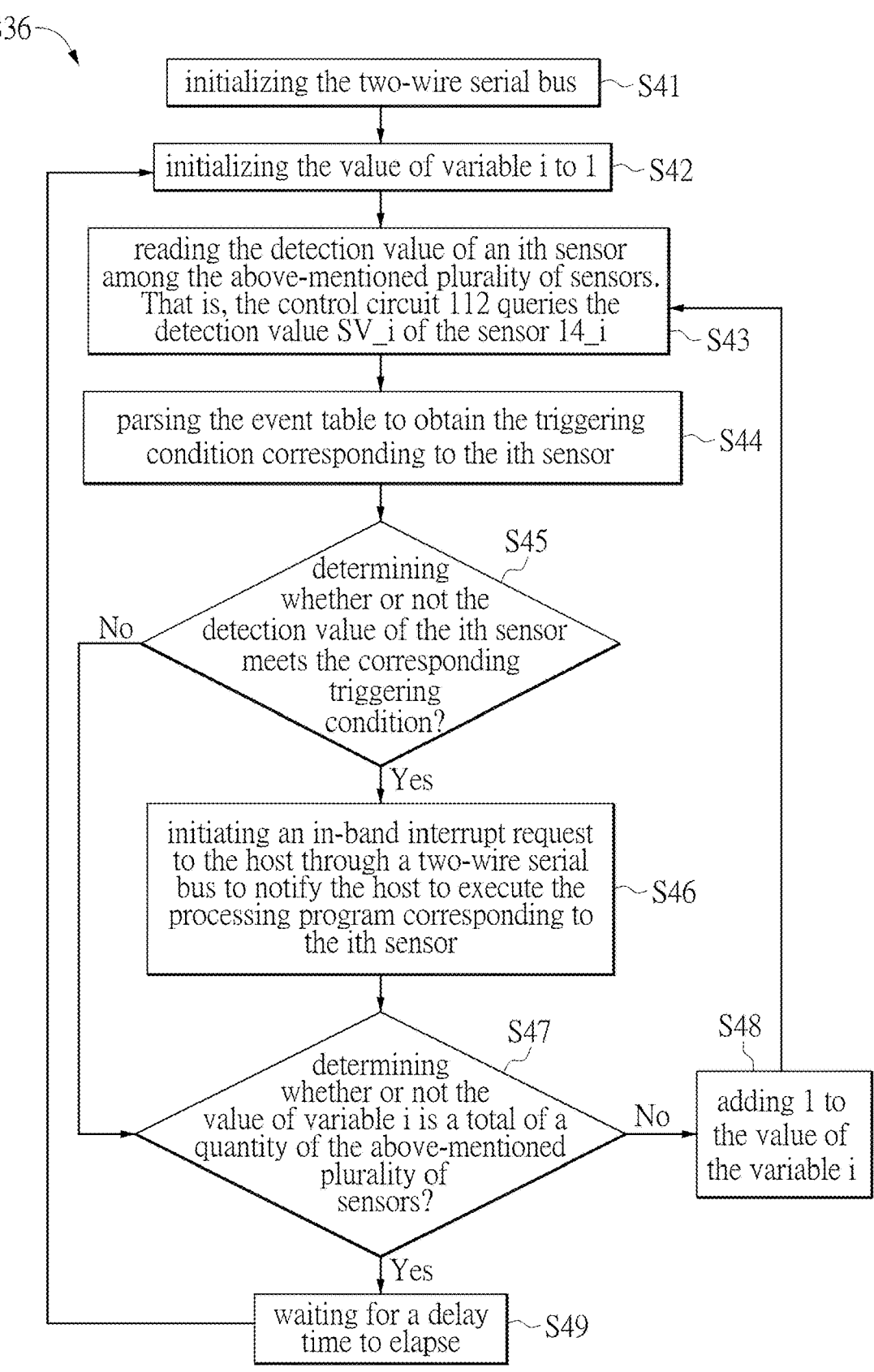
FIG. 4 is a flowchart of a control circuit periodically querying a detection value of each of the multiple sensors in sequence and initiating an in-band interrupt request to a host through the two-wire serial bus when a hub and the host communicate by using an I3C bus protocol according to one embodiment of the present disclosure.

Referring to FIG. 4, FIG. 4 is a flowchart of a control circuit periodically querying a detection value of each of the multiple sensors in sequence and initiating an in-band interrupt request to a host through the two-wire serial bus when a hub and the host communicate by using an I3C bus protocol according to one embodiment of the present disclosure. As shown in FIG. 4, step S36 in the above-mentioned embodiment may include the following processes.

Step S41 includes: initializing the two-wire serial bus.

Step S42 includes: initializing the value of variable i to 1.

Step S43 includes: reading the detection value of an it sensor among the above-mentioned plurality of sensors. That is, the control circuit 112 queries the detection value SV_i of the sensor 14_i.

Step S44 includes: parsing the event table to obtain the triggering condition corresponding to the ith sensor. Specifically, the control circuit 112 may obtain the triggering condition TC_i and the threshold TH_i corresponding to the sensor 14_i from the event table 111.

Step S45 includes: determining whether or not the detection value of the ith sensor meets the corresponding triggering condition; if true, step S36 enter steps S46 and S47 in sequence; if false, step S36 directly enters step S47.

Step S46 includes: initiating an in-band interrupt request to the host through a two-wire serial bus to notify the host to execute the processing program corresponding to the ith sensor.

Step S47 includes: determining whether or not the value of variable i is a total of a quantity of the above-mentioned plurality of sensors. That is, the control circuit 112 determines whether or not i equals to N; if false, step S36 enters step S48; if true, step S36 enters step S49.

Step S48 includes: adding 1 to the value of the variable i. After step S48, step S36 returns to step S43.

Step S49 includes: waiting for a delay time to elapse. After step S49, step S36 returns to step S42.

Therefore, according to the above-mentioned processes, the control circuit 112 is configured to periodically query the detection value of each of the sensors in sequence, and in response to determining that the detection value SV_i of the sensor 14_i meets the triggering condition TC_i corresponding to the sensor 14_i, the control circuit 112 notifies the host 13 through the two-wire serial bus 12 to execute the processing program corresponding to the sensor 14_i. It should be noted that, the variable i in this embodiment is designed to be increased from 1 to N (i.e., a total number of sensors 14_1 to 14_N), but the present disclosure is not limited thereto.

In other embodiments, in order to query the detection value of each of the sensors in sequence, the variable i may further be designed to be decreased from N to 1. That is, in step S42 of other embodiments, the control circuit 112 may be changed to initialize the value of the variable i to N, and in step S47 of other embodiments, the control circuit 112 may be changed to determine whether or not the value of the variable i is 1. In addition, in step S48 of other embodiments, the control circuit 112 may be changed to subtract 1 from the value of the variable i. Therefore, according to the above-mentioned changes, the control circuit 112 of other embodiments may also be able to periodically query the detection value of each of the sensors in sequence. Details regarding other embodiments are similar to above-mentioned descriptions, and will not be reiterated herein.

In conclusion, one of the advantages of the present disclosure is that, in the apparatus and the controlling method for a two-wire serial bus provided by the present disclosure, by virtue of "an event table configured to store a plurality of triggering conditions corresponding to the plurality of sensors," and "a control circuit configured to periodically query a detection value of each of the plurality of sensors in sequence, and in response to determining that the detection value of the sensor meets one of the triggering conditions corresponding to the sensor, the control circuit notifying the host through the two-wire serial bus to execute a processing program corresponding to the sensor," the system load of multiple sensors polled by a host on a two-wire serial bus is reduced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An apparatus, coupled between a host and a plurality of sensors via a two-wire serial bus, and the apparatus comprising:

a storage member configured to store an event table including a plurality of triggering conditions respectively corresponding to the plurality of sensors; and a control circuit, coupled to the storage member, configured to periodically query a detection value of each of the plurality of sensors in sequence, to determine that the detection value of the sensor meets one of the triggering conditions corresponding to the sensor, and to produce a notification signal to the host through the two-wire serial bus according to the determined result; wherein the notification signal indicates the sensor that meets the triggering condition; and wherein, the host executes a processing program corresponding to the sensor in response to the notification signal;

wherein the two-wire serial bus adopts a two-wire serial bus protocol, the two-wire serial bus protocol comprises a first serial communication protocol and a second serial communication protocol;

wherein the first serial communication protocol is backward compatible with the second serial communication protocol, the first serial communication protocol supports an in-band interrupt, and the second serial communication protocol does not support the in-band interrupt;

wherein the first serial communication protocol is used between the apparatus and the host; and the second serial communication protocol is used between the apparatus and at least one of the plurality of sensors;

wherein the apparatus initiates the in-band interrupt to the host through the two-wire serial bus to notify the host to execute the processing program corresponding to the at least one of the sensors.

2. The apparatus according to claim 1, wherein the event table is further configured to store a plurality of thresholds corresponding to the sensors, and wherein, for each of the sensors, the triggering condition corresponding to the sensor is one or a combination of an occurrence of a first change event and an occurrence of a second change event with respect to the detection value of the sensor.

3. The apparatus according to claim 2, wherein the occurrence of the first change event with respect to the detection value of the sensor is the detection value being changed to be from greater than a threshold corresponding to the sensor to less than or equal to the threshold, and the occurrence of the second change event with respect to the detection value of the sensor is the detection value being changed to be from less than a threshold corresponding to the sensor to greater than or equal to the threshold.

4. The apparatus according to claim 1, further comprising:
a management circuit, coupled between the host and the storage member, and configured to receive a setting command from the host via the two-wire serial bus and set the triggering conditions of the event table according to the setting command.

5. The apparatus according to claim 1, wherein the apparatus and the host communicate through the two-wire serial bus by using an improved inter-integrated circuit (I3C) bus protocol.

6. The apparatus according to claim 5, and each of the sensors is one of an I3C target device, an inter-integrated circuit (I2C) target device, and a system management bus (SMBus) target device.

7. The apparatus according to claim 1, wherein the event table includes a plurality of priority fields, and the values in the priority fields respectively correspond to the polling interval of the plurality of sensors.

8. A controlling method for a two-wire serial bus, wherein a hub is coupled between a host and a plurality of sensors, and the controlling method comprising:
utilizing an event table in the hub to store a plurality of triggering conditions corresponding to the plurality of sensors;
periodically querying, by the hub, a detection value of the plurality of sensors in sequence;

determining, by the hub, that the detection value of the sensor meets one of the triggering conditions corresponding to the sensor to generate a determined result;

producing, by the hub, a notification signal to the host through the two-wire serial bus according to the determined result; wherein the notification signal indicates the sensor that meets the triggering condition; and executing, by the host, a processing program corresponding to the sensor in response to the notification signal;

wherein the two-wire serial bus adopts a two-wire serial bus protocol, the two-wire serial bus protocol includes a first serial communication protocol and a second serial communication protocol;

wherein the first serial communication protocol is backward compatible with the second serial communication protocol, the first serial communication protocol supports an in-band interrupt, and the second serial communication protocol does not support the in-band interrupt;

wherein the first serial communication protocol is used between the hub and the host; and the second serial communication protocol is used between the hub and at least one of the plurality of sensors;

wherein the hub initiates the in-band interrupt to the host through the two-wire serial bus to notify the host to execute the processing program corresponding to the at least one of the sensors.

9. The controlling method according to claim 8, wherein the event table includes a plurality of thresholds corresponding to the sensors, and wherein, for each of the sensors, the triggering condition corresponding to the sensor is one or a combination of an occurrence of a first change event and an occurrence of a second change event with respect to the detection value of the sensor.

10. The controlling method according to claim 9, wherein the occurrence of the first change event with respect to the detection value of the sensor is the detection value being changed to be from greater than a threshold corresponding to the sensor to less than or equal to the threshold, and the occurrence of the second change event with respect to the detection value of the sensor is the detection value being changed to be from less than a threshold corresponding to the sensor to greater than or equal to the threshold.

11. The controlling method according to claim 8, further comprising:
setting the triggering conditions stored in the event table according to a setting command from the host.

12. The controlling method according to claim 8, wherein the hub and the host communicate through the two-wire serial bus by using an improved inter-integrated circuit (I3C) bus protocol.

13. The controlling method according to claim 12, wherein each of the sensors is one of an I3C target device, an inter-integrated circuit (I2C) target device, and a system management bus (SMBus) target device.

14. The controlling method according to claim 8, wherein the event table includes a plurality of priority fields, and the values in the priority fields respectively correspond to the polling interval of the plurality of sensors.

* * * * *